US006788508B2

(12) United States Patent
Papallo, Jr. et al.

(10) Patent No.: US 6,788,508 B2
(45) Date of Patent: Sep. 7, 2004

(54) COMPACT LOW AMP ELECTRONIC CIRCUIT BREAKER OR RESIDENTIAL LOAD CENTER

(75) Inventors: Thomas F. Papallo, Jr., Farmington, CT (US); Dennis Wayne Heath, Avon, CT (US)

(73) Assignee: General Electric Company, Schenectady, NY (US)

( * ) Notice: Subject to any disclaimer, the term of this patent is extended or adjusted under 35 U.S.C. 154(b) by 141 days.

(21) Appl. No.: 09/682,996

(22) Filed: Nov. 6, 2001

(65) Prior Publication Data

US 2003/0086228 A1 May 8, 2003

(51) Int. Cl.⁷ ................................................ H02H 3/00
(52) U.S. Cl. ......................................... 361/64; 700/22
(58) Field of Search .............................. 361/42–50, 62, 361/63, 64, 94, 97, 99; 340/638; 700/92, 286, 291, 292, 293, 295

(56) References Cited

U.S. PATENT DOCUMENTS

| | | | |
|---|---|---|---|
| 4,918,566 A | | 4/1990 | Brodsky et al. ............ 361/166 |
| 4,920,476 A | | 4/1990 | Brodsky et al. ............ 364/140 |
| 5,184,278 A | * | 2/1993 | Jordan et al. ................ 361/627 |
| 5,373,411 A | * | 12/1994 | Grass et al. ................... 361/64 |
| 5,541,808 A | * | 7/1996 | Bastian ........................ 361/605 |
| 5,583,732 A | | 12/1996 | Seymour et al. .............. 361/93 |
| 5,705,862 A | * | 1/1998 | Lutz et al. ................... 307/147 |
| 5,861,683 A | | 1/1999 | Engel et al. ................... 307/38 |
| 6,034,581 A | * | 3/2000 | DiMarco et al. .............. 335/16 |
| 6,127,742 A | * | 10/2000 | Weynachter ................... 307/38 |
| 6,144,537 A | * | 11/2000 | Boteler ......................... 361/42 |
| 6,255,923 B1 | | 7/2001 | Mason, Jr. et al. ........... 335/18 |
| 6,268,989 B1 | * | 7/2001 | Dougherty et al. ........... 361/63 |

* cited by examiner

Primary Examiner—Ronald Leja
(74) Attorney, Agent, or Firm—Cantor Colburn LLP (57) ABSTRACT

A panelboard configured for distributing electricity from a power source, the panelboard comprising circuitry for distributing the electricity from the power source, the circuitry comprising a plurality of branch circuits for distributing electricity to associated loads; a plurality of branch circuit breakers, each branch circuit breaker intermediate the power source and the plurality of branch circuits; and an electronic control module for controlling the main circuit breaker and the plurality of branch circuit breakers, the electronic control module provides a protection function and a monitoring function of the circuitry, each branch circuit breaker of the plurality of branch circuit breakers includes; a pair of separable contacts, an electromagnetic actuator in electrical communication with the electronic control module for operably controlling the pair of separable contacts, and a current transformer configured to sense current on the circuitry to one of the associated loads. A method is also described for providing overcurrent protection and control to an electric circuit with a single controller, the method comprising: receiving a trip setting value selected for each branch circuit of a plurality of branch circuits; storing the trip setting value in non-volatile memory; receiving a plurality of sensed signals from a current sensing device employed in the each branch circuit indicating a current therethrough; processing the plurality of sensed signals to detect an overcurrent condition in the each branch circuit; and generating a trip signal to an electromagnetic device coupled to separable contacts employed in each circuit breaker of the each branch circuit for interrupting current therein when an overcurrent condition is detected.

37 Claims, 4 Drawing Sheets

COMPACT LOW AMP ELECTRONIC CIRCUIT BREAKER OR RESIDENTIAL LOAD CENTER

BACKGROUND OF INVENTION

An electrical distribution system within an industrial, commercial or residential property starts at the utility service entrance and ends at the final utilization equipment or loads. The service entrance includes the utility company's watt-meter or kWh meter. Beyond the utility company's meter is a main circuit interrupting device, such as a circuit breaker. The main circuit breaker supplies power to a number of feeder circuits which in turn power a number of branch circuits. In a small system, such as a home, the main circuits directly feed individual branch circuits and no feeder circuits are employed. The electrical utilization loads are normally located on the branch circuits.

Typically, circuit breakers are used on the branch circuits to protect electrical circuitry from damage due to an over-current condition, such as an overload condition or a relatively high level short circuit condition. Circuit breakers employed in a commercial or residential setting are mounted in the panelboard. In residential or low ampacity circuit breakers, the circuit breakers are typically calibrated to a specific current value and with a specific trip time curve.

In contrast, industrial circuit breakers have used the concept of rating plugs with electronic trip units for many years to set the current ratings thereof. By inserting a rating plug, having a discrete resistance value, into a circuit breaker trip unit, the current rating is set for the industrial circuit breaker. Residential circuit breakers do not have the size or cost structure to accept rating plugs and consequently, residential circuit breakers are for practical purposes limited to a predetermined current rating.

Consequently, residential low ampacity circuit breakers have traditionally used the older thermal magnetic technology which does not have ready methods for changing the current rating of the circuit breaker. The thermal trip characteristic is operative in response to overload current of extended duration which heats a bimetal member, causing movement of the latter, which in turn releases a latch to trip open a set of contacts. The magnetic characteristic is operative in response to a sudden high magnitude current overload condition, and uses the magnetic field generated in a magnetic core to attract typically an armature, which movement releases the latch to open the contacts. As an example, the magnetic type actuation occurs in response to a short circuit wherein the hot line conductor becomes directly connected with ground or neutral, bypassing the load.

In either an industrial or residential environment, it is important to provide a management system which facilitates the monitoring and accurate control of electricity. The evolution and resulting dependency on digital computers and communication networks connecting these computers, such as data processing centers, has created a demand for high accuracy low ampacity circuit breakers to protect such critical load applications in branch circuits. Furthermore, advanced monitoring and remote control traditionally found in large, expensive industrial circuit breakers is desired for residential and commercial low ampacity circuit breakers without a premium price and size penalty.

It is known to employ electronic control, such as a computer, for controlling the solenoids of a plurality of circuit breakers in a panelboard. It is also known to employ the computer to monitor the status of the circuit breakers in a panelboard from the status contacts. What is needed is a low cost compact individual circuit breaker that allows for tailored protection to meet specific load requirements.

SUMMARY OF INVENTION

The above discussed and other drawbacks and deficiencies are overcome or alleviated by a panelboard configured for distributing electricity from a power source. The panelboard comprises: circuitry for distributing the electricity from the power source, the circuitry comprising a plurality of branch circuits for distributing electricity to associated loads; a plurality of branch circuit breakers, each branch circuit breaker intermediate the power source and the plurality of branch circuits; and an electronic control module for controlling the main circuit breaker and the plurality of branch circuit breakers, the electronic control module provides a protection function and a monitoring function of the circuitry, each branch circuit breaker of the plurality of branch circuit breakers includes; a pair of separable contacts, an electromagnetic actuator in electrical communication with the electronic control module for operably controlling the pair of separable contacts, and a current transformer configured to sense current on the circuitry to one of the associated loads.

A method is also described for providing overcurrent protection and control to an electric circuit with a single controller, the method comprising: receiving a trip setting value selected for each branch circuit of a plurality of branch circuits; storing the trip setting value in non-volatile memory; receiving a plurality of sensed signals from a current sensing device employed in the each branch circuit indicating a current therethrough; processing the plurality of sensed signals to detect an overcurrent condition in the each branch circuit; and generating a trip signal to an electromagnetic device coupled to separable contacts employed in each circuit breaker of the each branch circuit for interrupting current therein when an overcurrent condition is detected.

BRIEF DESCRIPTION OF DRAWINGS

Referring to the drawings wherein like elements are numbered alike in the several Figures.

DETAILED DESCRIPTION

Figure 1:
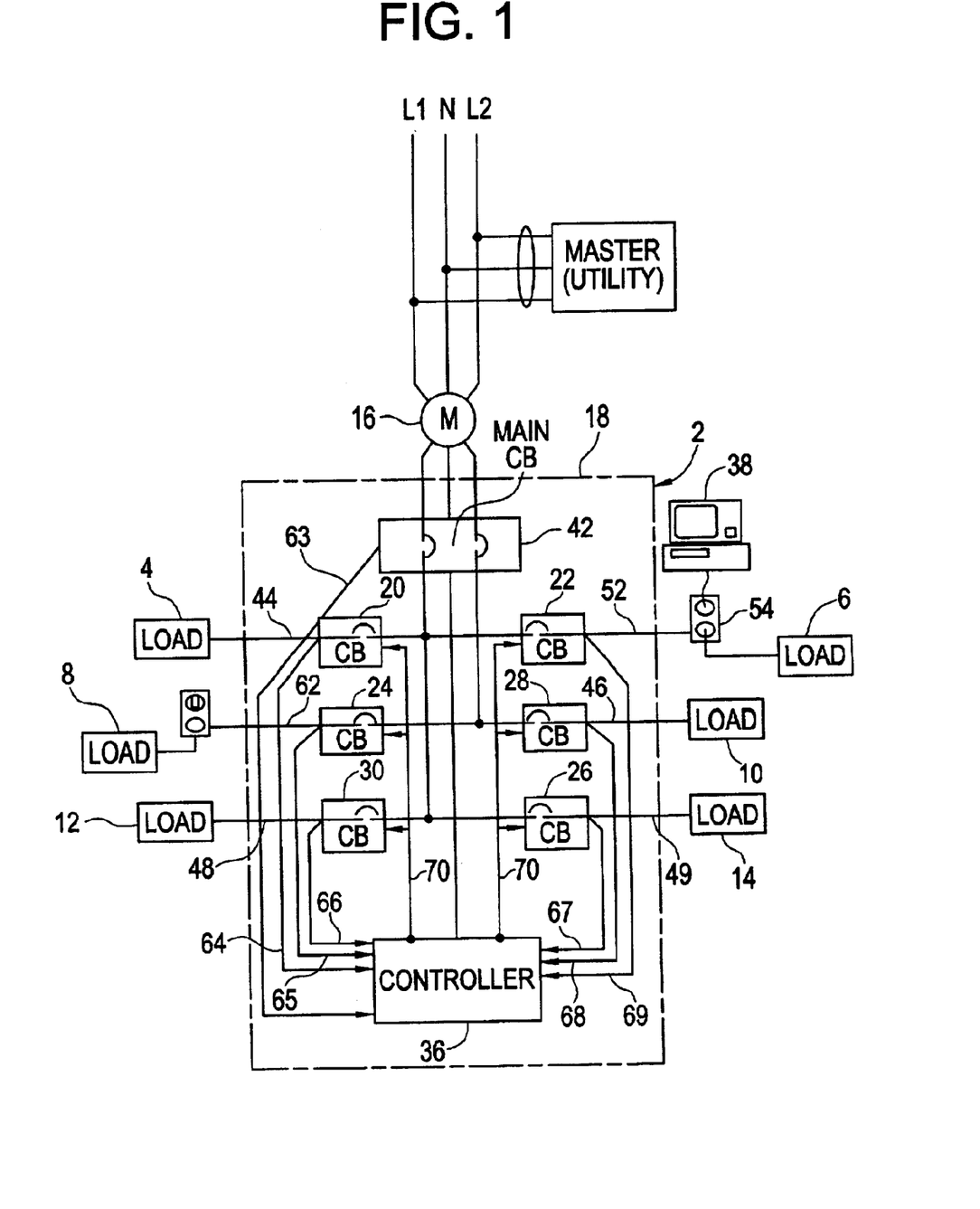
FIG. 1 is a block diagram of a panelboard having a plurality of branch circuit breakers, a main circuit breaker, and a controller employed for overcurrent protection and monitoring.

Referring to FIG. 1, a panelboard 2 for alternating current (AC) power lines L1,L2, neutral line N, and loads 4,6,8,10, 12,14 is illustrated. The lines L1,L2,N supply voltage (e.g., conventional 120/240 VAC, single phase, three wire) to panelboard 2 through meter (M) 16. Panelboard 2 includes a box or housing, such as an enclosure 18, branch circuit breakers (CB) 20,22,24,26,28,30 housed by enclosure 18, and an Electronic Overload Relay and Monitoring Module (EORMM) or controller 36 at least substantially within the enclosure 18. Although two power lines and six branch circuit breakers are illustrated, it will be appreciated that a wide variety of power line and circuit breaker counts may be employed. The controller 36 communicates with each branch circuit breaker 20,22,24,26,28,30, monitors (e.g., monitors each circuit breaker current through a current sensing transformer employed in each circuit breaker), and controls branch circuit breakers 20,22,24,26,28,30, which are discussed below in connection with FIG. 2.

In the exemplary embodiment of FIG. 1, panelboard 2 has one main circuit breaker (MAIN CB) 42 and a plurality of CBs 20,22,24,26,28,30, with CBs 20,22,26,30 powered through MAIN CB 42 by line L1, and with CBs 24,28 powered through MAIN CB 42 by line L2. Each of the branch circuits 44, 52, 62, 46, 48, 49 is respectively powered through CB's 20, 22, 24, 28, 30, 26 and are each monitored for current. A computer 38 is connected to branch circuit 52 via electrical outlet 54. In many critical uptime applications, (i.e., using computer 38), it is critical to monitor and control current in such a branch circuit to avoid an interruption caused by an overcurrent condition. For example, the output of a current transformer (CT) (not shown) located within branch circuit breaker 20 yields an output $I_1$, indicative of the current in circuit 44, which is fed to controller 36 via line 64. The main circuit breaker 42 and each of the other branch circuits is similarly monitored by sensing the current with a CT employed in each circuit breaker and a corresponding signal indicative of current flow is fed to controller 36 via lines 63, 65, 66, 67, 68, 69. Controller 36 processes the signals received from each line 63,64,65,66,67,68,69 to determine whether an overcurrent exists. If controller 36 detects an overcurrent condition in one or more CB, an actuation signal is outputted to one or more CBs via a control bus 70 to actuate the opening of contacts within the respective circuit breakers. In one embodiment, as in FIG. 2, an addressable device 101 is located in panelboard 2 and sends the actuation signal to a corresponding circuit breaker for actuation. In another embodiment, depicted in FIGS. 3 and 4, control bus 70 is substituted with a hard wired configuration for connection and actuation of each circuit breaker. In addition, it is contemplated that controller 36 optionally include a high current alarm, a breaker trip alarm, and/or remote communication control and monitoring for each circuit breaker employed in panel board 2. Moreover, controller 36 may optionally include a neutral current transformer and a ground fault alarm or trip indicative of ground fault through main circuit breaker 42. The high current alarm indicates a near overcurrent condition, thus allowing protective measures to be undertaken before the circuit is interrupted. Similarly, the breaker trip alarm provides notice of an interrupted circuit that may otherwise go undetected for some time. The ground fault alarm would provide notice of a potentially dangerous leakage of current.

Figure 2:
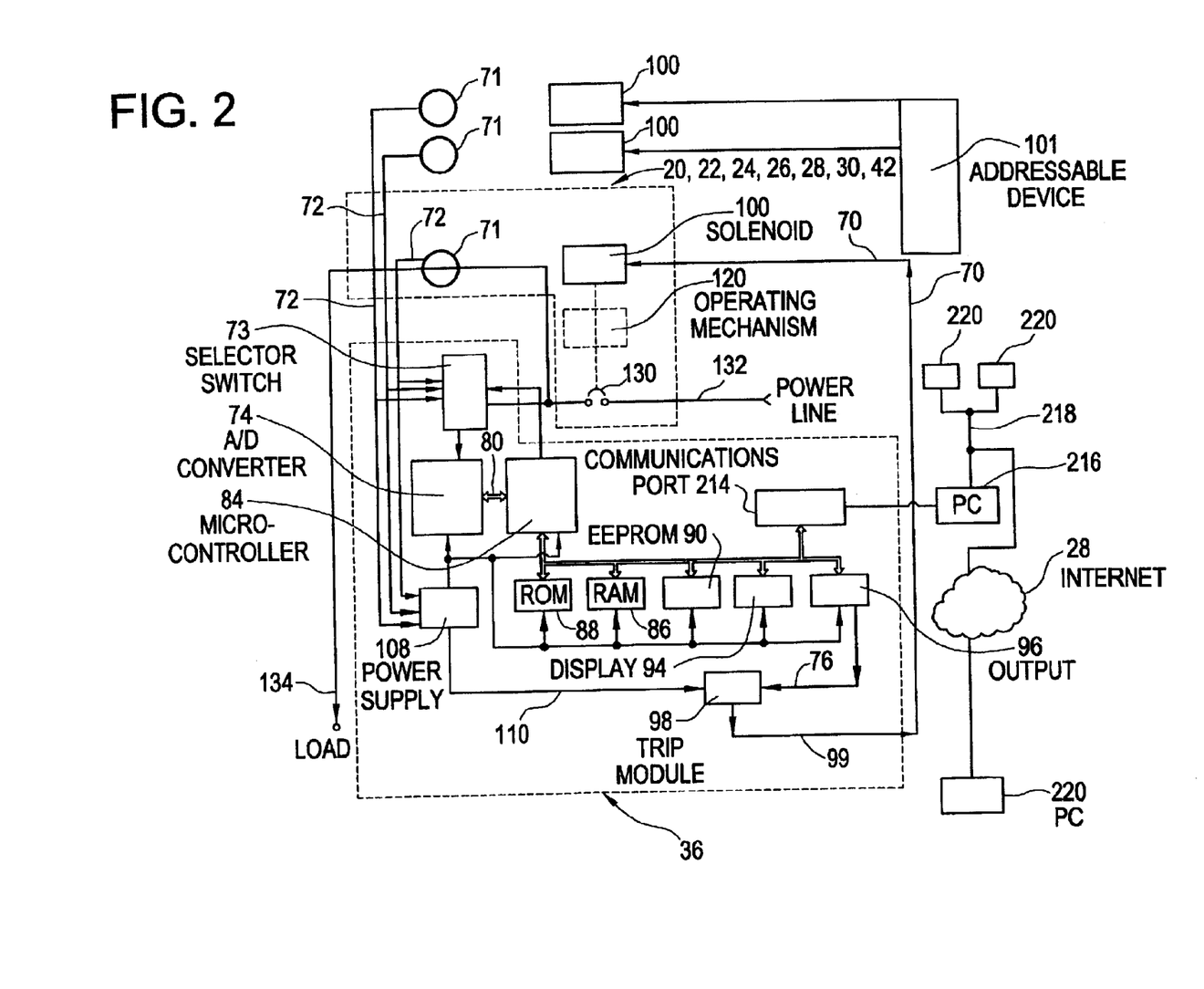
FIG. 2 is a schematic representation of the controller in communication with either the main circuit breaker or with one of the plurality of circuit breakers of FIG. 1.

FIG. 2 is a schematic block diagram of controller 36 and one of either main circuit breaker 42 and branch circuit breakers 20, 22, 24, 26, 28, 30, the controller generally shown at 36. Although four circuit breakers are shown with controller 36, it will be understood that a plurality of branch circuit breakers including a main circuit breaker is contemplated to be connected with controller 36. Controller 36 receives an input signal from a current sensor 71 employed in each circuit breaker and provides an analog signal indicative of current measurements on a signal line 72. The analog signal on line 72 is presented to a multiplexer or selector switch.73. Selector switch is controlled by a microprocessor or microcontroller 84 to select an input channel or multiple channels. The analog signal is presented to an A/D (analog/digital) converter 74, which converts this analog signal to a digital signal. The digital signal is presented over a bus 80 to a microcontroller (signal processor) 84, such being commercially available from Texas Instruments (e.g., Texas Instruments" TMS320 type processor). The digital signal is accumulated in memory corresponding to the input channel that was previously selected by the microcontroller 84 and output by the selector switch. 73. Controller 36 further includes RAM (random access memory) 86, ROM (read only memory) 88 and EEPROM (electronic erasable programmable read only memory) 90 all of which communicate with the microcontroller 84 over a control bus 92. It will be appreciated that selector switch 73, A/D converter 74, ROM 88, RAM 86, or any combination thereof, may be internal to microcontroller 84, as is well known. EEPROM 90 is non-volatile so that system information and programming will not be lost during a power interruption or outage. Data, typically status of the circuit breaker, is displayed by a display 94 in response to display signals received from microcontroller 84 over control bus 92. An output control device 96, in response to control signals received from microcontroller 84 over control bus 92, controls a trip module 98 via signal line 76. Trip module 98 processes the signal generated from microcontroller 84 to verify an overcurrent condition, and generates an actuation signal 99 via control bus 70 to an electromagnetic actuator, such as a solenoid 100 if an overcurrent condition is detected. Power supply 108 provides an actuation voltage 110 to trip module 98, which in turn generates the actuation signal 99 to solenoid 100 that trips a mechanical operating mechanism 120. Operating mechanism 120 in turn opens the circuit breaker contacts 130 that provide an electrical connection between the power line 132 and the load 134. Power supply 108 and thereby controller 36 optionally receive electrical power generated from one or more current transformers 71 via line 136 to provide the electrical power necessary to operate controller 36. Controller 36 may also use L1/L2, L1/N or L2/N voltages (See FIG. 1). This is possible, even with very small VA sources, because a magnet, 334, is retained within circuit trip assembly 320 (See FIG. 4). In addition, the electrical power necessary to actuate solenoid 100 is optionally supplied by current transformer 71.

Microcontroller 84 processes signals received from a number of circuit breakers in panelboard 2 to determine whether an overcurrent condition exists in an individual or multiple branch circuits or in the main circuit. When an overcurrent condition exists, microcontroller 84 generates an output signal via signal line 76 received by trip module 98. Trip module 98 generates an addressed actuation signal 99 to solenoid 100 of the respective circuit breaker(s) to cause operating mechanism 120 to trip the circuit breaker by opening the contacts 130.

Microcontroller 84 is disposed in controller 36 in communication with the main circuit breaker 42 and with the various branch circuit breakers of panelboard 2.

Microcontroller 84 receives informational signals from each of the current transformers 71 employed in each circuit breaker, quantifies the received information, and provides an output command signal in response thereto, in this instance, for example, to the trip module 98 addressing a particular solenoid 100 to be actuated through control bus 70 addressable device 101. Communications, informational signals and commands as such may be employed by microcontroller 84 to facilitate execution of control processes and or algorithms including, but not limited to, setting trip points for individual circuit breakers, and/or the trip-time curve characteristic for each circuit breaker discussed herein.

In order to perform the prescribed functions and desired processing, as well as the computations therefore (e.g., the execution of the trip-time curve algorithm(s), and the like), microcontroller 84 may include, but not be limited to, a processor(s), computer(s), memory, storage, register(s), timing, interrupt(s), communication interfaces, and input/output signal interfaces, and the like, as well as combinations comprising at least one of the foregoing. For example, microcontroller 84 may include signal input filtering to enable accurate sampling and conversion or acquisitions of such signals from communications interfaces.

Figure 3:
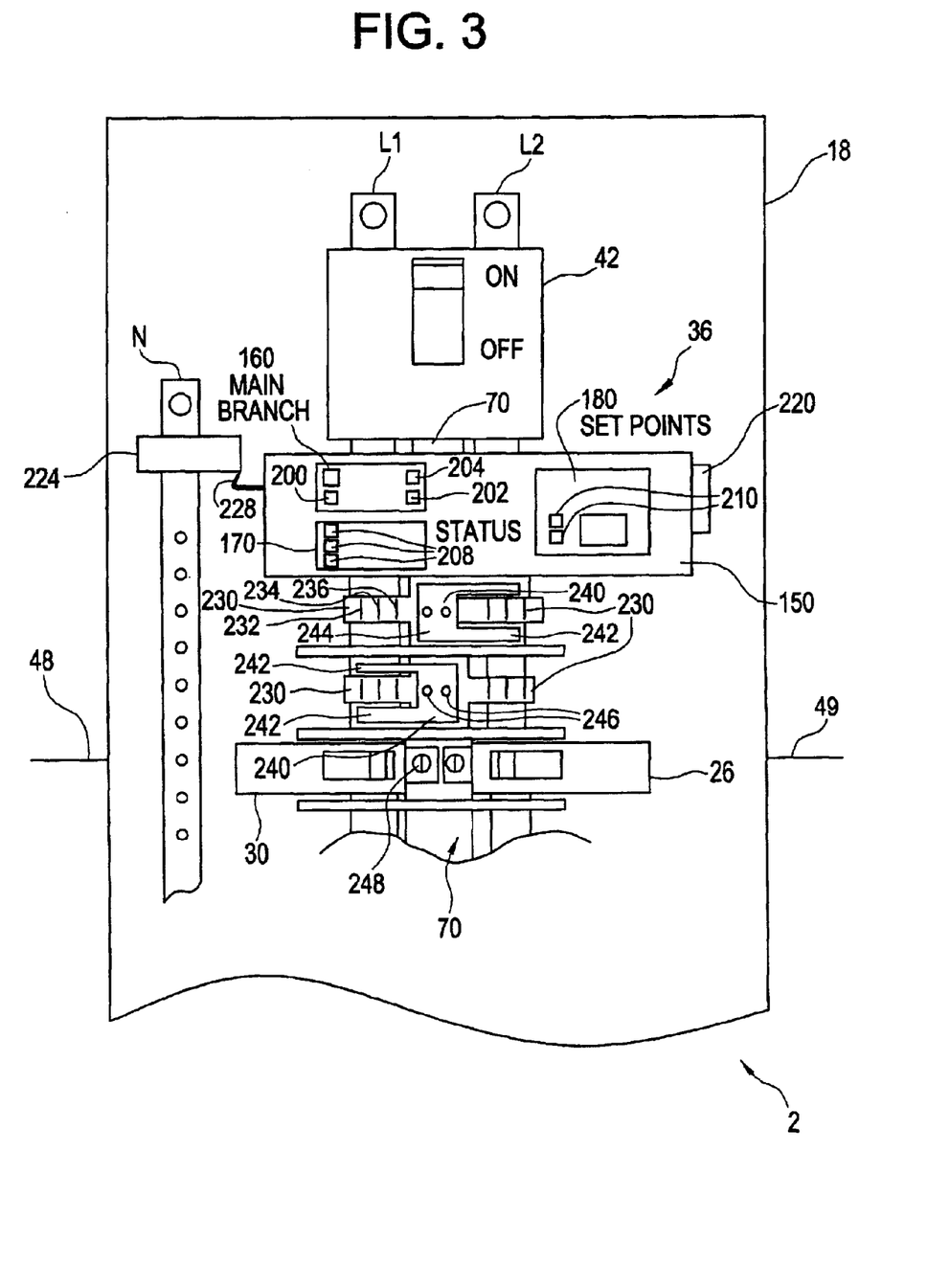
FIG. 3 is a front view of the panelboard shown in FIG. 1 illustrating partial section views of the panelboard having two branch circuit breakers employed therein.

Referring now to FIG. 3, a front view of panelboard 2 shown in FIG. 1 illustrating partial section views of panelboard 2 having two branch circuit breakers 26, 30 employed therein is shown. Electrical conductors, L1, L2, and N terminals, are insulatively mounted along the length of panelboard 2, such that they do not short with each other through contact with housing 18. Main circuit breaker is electrically connected to both L1 and L2. Controller 36 is disposed between main circuit breaker 42 and branch circuit breakers 20, 22, 24, 26, 30. Controller 36 includes a control panel 150 for a user interface having three sections, a first section 160, a second section 170, and a third section 180. First section 160 includes a first keypad 200 for selecting a branch circuit breaker to display and monitor an indication of the current flow therein. A first display 202 of display 94 indicates the current flow in a branch circuit breaker selected by keypad 200 or any breaker in alarm or overcurrent condition and indicates the branch circuit breaker selected. A third display 204 of display 94 indicates the current flow in main circuit breaker 42. Second section 170 of control panel 150 indicates the status of a branch circuit breaker selected in first section 160 with first keypad 200. A plurality of Light Emitting Diodes (LEDs) 208 is used having different colors to indicate the status of a particular branch circuit 48, 49. For instance, an LED may be illuminated green to indicate a healthy circuit or may be illuminated yellow to warn of a potential overcurrent condition. An LED 208 may be illuminated red to indicate a tripped circuit. It is contemplated that controller 36 emits an audible alert or alarm when a branch circuit breaker has tripped and does not matter if that particular branch circuit is selected on control panel 150. Data, typically status of the circuit breaker, is displayed by the display 94 in response to display signals received from microcontroller 84 over control bus 92 (see FIG. 2). The third section 180 includes a keypad 210 for inputting set point data and a display 212 of display 94 for indicating set points selected with keypad 210.

A communications port is an alternative input source to keypads 200 and 210. Communications port 214 provides a remote means for inputting the long delay, short delay and instantaneous trip setting values to be stored in memory designated for each branch circuit breaker and main circuit breaker 42. It should be noted that a trip setting value inputted via communications port 214 replaces the trip setting value previously stored in memory associated for that particular circuit breaker selected.

The communications network interface 214 for remote digital input and monitoring includes, but is not limited to, one of or a combination of: a direct connection to a personal computer (PC) 216, a dialup connection (e.g., Internet) 130, or a local area network (LAN) 218 connecting a number of remote PCs 220 having a host controller PC 216 providing a signal 135 to the communications port 214 of controller 36. The communications port 214 in turn provides a signal indicating the current flow within a circuit breaker selected and any trip setting value stored in local memory for viewing by a remote user. Remote utilization of controller 36 includes a remote digital input using a display based user interface having a display and a keypad combination that provides a digital menu, such as PCs 214 and 220, allowing settings to either be scrolled through or chosen with the keypad.

Panelboard 2 optionally includes a neutral current transformer 224 employed with neutral strap (N). Controller 36 receives a signal from neutral current transformer 224 via line 228 to sense current in neutral strap used in the calculations to indicate a ground fault through the main circuit breaker 42.

Branch circuit breakers 26 and 30 are disposed below controller 36 as shown in FIG. 3, however they may be disposed in any relation relative to controller 36. Branch circuit breaker and main circuit breaker are in electrical communication with controller 36 via secondary (control) breaker connections 230. In one embodiment, secondary breaker connection 230 is an electrical receptacle configured to receive a complementary configured electrical connector disposed on the branch circuit breaker. Three electrical terminals 232,234,236 depend from the receptacle providing electrical connection to the controller 36. As discussed above, FIG. 3 shows a hardwired solenoid 100, the three terminal connections include a common, sensed current, and solenoid trip connections. Two of the terminals 232,234 provide a path to and from solenoid 100 to complete an electrical path for actuation of solenoid 100 when commanded by controller 36 via signal 99. The third terminal 236 is for receiving a signal indicative of the current of the circuit breaker to be processed by controller 36. It is contemplated that the main circuit breaker 42 is connected to two secondary breaker connections 230 when main circuit breaker 42 has a current transformer 71 and a set of contacts 130 for each of the two power lines L1, L2. The secondary breaker connections 230 to controller 36 define control bus 70. In an exemplary embodiment, control bus 70 comprises a set of three wires or conductors for each circuit breaker connected to controller 36. It is contemplated, however, that control bus 70 is optionally configured with microcontroller 84 to include an addressing means for communication with each circuit breaker installed in panelboard 2.

Branch circuit breakers 26 and 30 are electrically connected to power line L2 via a primary breaker connector 240 that is disposed intermediate a bottom surface of branch circuit breaker 26, for example, and a top surface of power line conductor L2. Primary breaker connector 240 comprises a planar electrically conductive material and is substantially U-shaped having legs 242 disposed on either side of secondary breaker connection 230. Legs 242 meet at a base portion 244 where two threaded apertures 246 are formed therein to threadably receive a threaded fastener 248 to electrically connect a line strap of one of two branch circuit breakers to be connected to one of power lines L1, L2. It will be understood that vertically contiguous primary breaker connectors 240 have legs 242 in electrical connection with alternating power lines L1, L2 to equally distribute the current flow in each power line L1, L2 as illustrated by the two primary breaker connectors shown without any branch circuit breaker connected thereto. Alternately, a plug in primary power connection may be employed.

Figure 4:
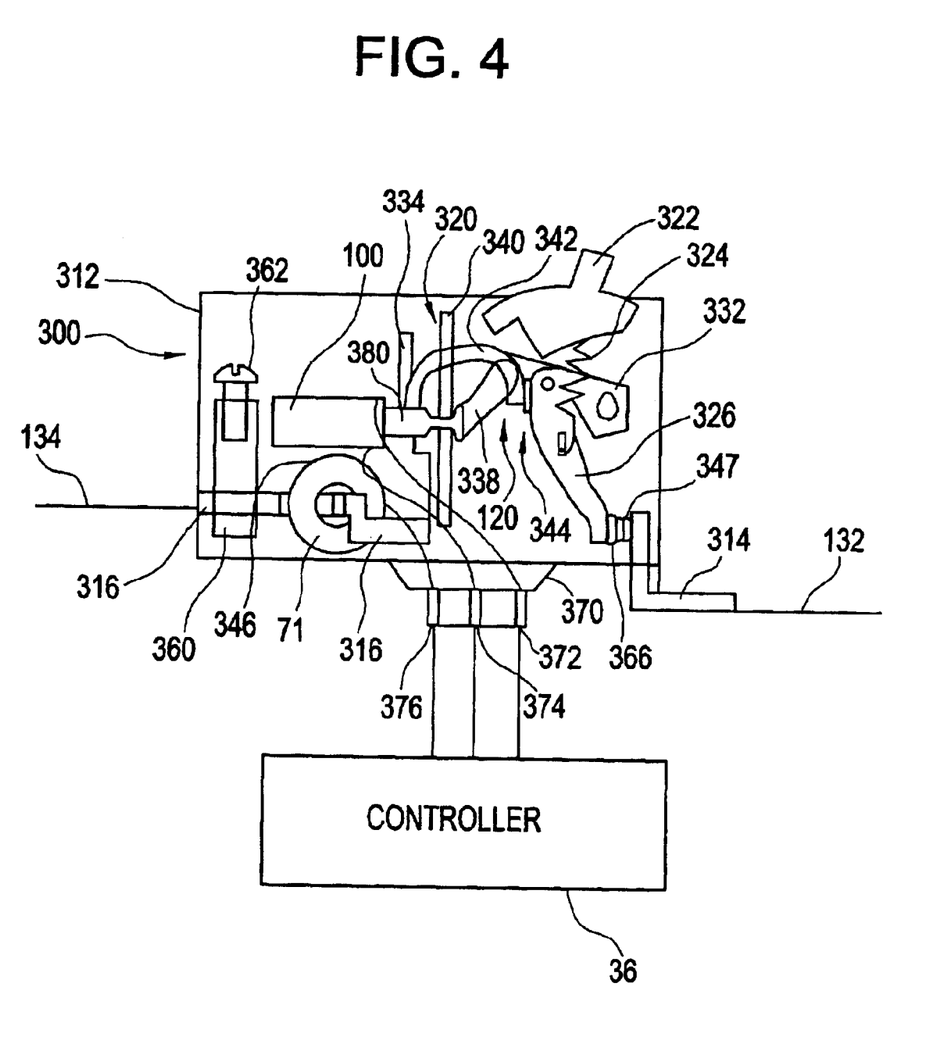
FIG. 4 is a schematic side view of one of the branch circuit breakers of FIG. 3 in communication with the controller.

Reference is generally made to FIGS. 1–4 wherein a circuit breaker (main or branch), generally indicated at 300 in FIG. 4, is constructed in accordance with the following discussion herein. It should be understood however, that certain features, such as the circuit trip assembly as disclosed below, is by way of example and not limitation, as it will be clear that an exemplary circuit breaker, most specifically disclosed with reference to FIG. 4, is applicable to a wide range of general circuit breaker constructions, such as the preferred construction disclosed herein (FIG. 4). It should also be understood that the present invention can be adapted to be utilized with prior art circuit breaker constructions, as will be understood by one of skill in the art.

Circuit breaker 300 includes a housing 312, a stab line terminal 314 and a stab load terminal 316 which may be fully or at least partially disposed within housing 312, and a circuit trip assembly 320 which electrically couples line strap 314 and load strap 316 when circuit breaker 300 is in a first (or closed) condition and electrically decouples line strap 314 and load strap 316 when circuit breaker 300 is in a second (or open) condition. Reference to a "second" condition can be initiated by a switch 322 which is connected with a spring 324 to movable contact arm 326. Circuit breaker 300 is in the first or closed condition in FIG. 4, while the circuit breaker 300 in the second or open condition is not shown. Generally speaking (again the details are omitted for simplicity), a circuit trip assembly 320, generally indicated at 320, may include a rotatable cradle generally indicated at 332, the movable contact arm 326 contactable with line terminal 314, a magnet 334, an armature latch 338, connected at one end to cradle 324 and at another end to an armature 340, and a braided flexible conductor 342 electrically connecting movable contact arm 324 to load terminal 316, the functions of which are all well known in the art, along with additional details such as springs and other features for properly biasing the illustrated elements.

Housing 312 comprises a mechanical compartment 344 and an electronics compartment 346 defined therein. Within the mechanical compartment 344, line strap 314 is electrically connected to an electrical distribution circuit (not shown). A stationary contact 347 is fixed to the end of the line strap 314. Rotatably secured within mechanical compartment 344 is movable contact arm 326. Movable contact arm 326 is electrically connected to flexible conductor 342, which is electrically connected to load strap 316. Load strap 316 is electrically connected to a protected portion of the electrical distribution circuit (not shown) via load lug 360 and threaded fastener 362. Attached to the end of movable contact arm 326 is a movable contact 366. During quiescent operation of the circuit breaker 300, the fixed and movable contacts 347 and 366 are in contact with each other, allowing the flow of electrical current from the distribution circuit through the line strap 314, fixed contact 347, movable contact 366, contact arm 326, flexible connector 342, load strap 316, and load lug 360 to the protected portion of the distribution circuit.

Certain overcurrent conditions (i.e., short circuit) in the electrical distribution circuit will cause the magnet 334 to attract the armature 340 by the electromagnetic force proportional to the current flowing through load terminal 316. At a predetermined current, the electromagnetic force overcomes a bias acting on the armature 340, releasing cradle latch 338 in the operating mechanism generally shown at 120 connected to the movable contact arm 326. When the armature 340 moves toward the stator magnet 334, the cradle latch trips the operating mechanism 120, which rotates the contact arm 326 to separate the stationary and movable contacts 347 and 366. Separation of the stationary and movable contacts 347 and 366 stops the flow of electrical current to the protected portion of the distribution circuit.

Within the electronics compartment 346 of the circuit breaker housing 312, a trip mechanism, such as solenoid 100, is arranged to interact with the release latch of the operating mechanism 120. Also secured within the electronics compartment 346 is current transformer 71 surrounding load strap 316. Depending from housing 312 is a module plug 370 for electrically connecting current transformer 71 and solenoid 100 to controller 36. It should be noted that module plug 370 is configured to make electrical contact with controller 36 before terminal 314 makes electrical contact with either power line L1, L2. Extending from the module plug 370 are three terminals 372, 374 and 376 for electrical connection with terminals 232, 234, and 236 of secondary breaker connection 230 in communication with controller 36. Terminals 372 and 374 have a wire leading from each lead to solenoid 100 for operation of the solenoid 100 by controller 36. Terminal 376 has a wire leading to current transformer 71 for receiving a signal indicative of current for the controller 36 to process. Terminals 372, 374, 376 are optionally connected to the current transformer 71 and solenoid 100 with other methods as known in the art, such as with a printed circuit board and the like.

In response to the actuation signal 99, solenoid 100 is activated to pull a plunger 380 to overcome a bias acting on the plunger 380, releasing cradle latch 338 in operating mechanism 120 connected to movable contact arm 326. When plunger 380 moves toward solenoid 100, the cradle latch trips operating mechanism 120, which rotates the contact arm 326 to separate the stationary and movable contacts 347 and 366. Separation of stationary and movable contacts 347 and 366 stops the flow of electrical current to the protected portion of the distribution circuit.

The above described circuit breakers in communication with a single electronic control module (controller 36) provides advanced monitoring and control of low ampacity branch circuits connected to a panelboard. Traditionally, such highly accurate protection, control and monitoring has been reserved to industrial applications because of the size and cost associated with this measure of circuit protection. The single controller employed for multiple branch circuit protection and monitoring offers specific tailored control of critical uptime loads connected to these branch circuits, such as computers, servers, routers and the like, while minimizing the space and costs associated with a single controller. Likewise, by maintaining a centralized controller for control of all branch circuit breakers within a panelboard, including the main circuit breaker, existing circuit breaker dimensions may be utilized eliminating the size penalty normally associated with incorporating electronic control of each.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A panelboard configured for distributing electricity from a power source, said panelboard comprising:

circuitry for distributing said electricity from said power source, said circuitry comprising a plurality of branch circuits for distributing electricity to associated loads;

a plurality of branch circuit breakers, each branch circuit breaker intermediate said power source and said plurality of branch circuits; and a single electronic control module for controlling a main circuit breaker and said plurality of branch circuit breakers, said electronic control module provides a protection function and a monitoring function of said circuitry, each branch circuit breaker of said plurality of branch circuit breakers includes:
- a pair of separable contacts;
- an electromagnetic actuator in electrical communication with said electronic control module for operably controlling said pair of separable contacts; and
- a current transformer configured to sense current on said circuitry to one of said associated loads.

2. The panelboard in claim 1 farther including said main circuit breaker for interrupting electricity from said power source; said main circuit breaker including:
- a pair of separable contacts;
- an electromagnetic actuator in electrical communication with said electronic control module for operably controlling said pair of separable contacts, and
- a current transformer configured to sense current on said circuitry through said main circuit breaker.

3. The panelboard in claim 2 wherein said protection function provided by said electronic control module allows for selling a trip setting value for said main circuit breaker.

4. The panelboard in claim 2 wherein said current transformer provides electric power to said electronic control module.

5. The panelboard in claim wherein said electric power provides an actuation voltage to a trip module for actuating said electromagnetic actuator.

6. The panelboard in claim 2 wherein said monitoring function provided by said electronic module includes a signal received from each said current transformer, said signal is processed by said electronic module indicative of current flow through said circuitry.

7. The panelboard in claim 6 wherein said electronic module outputs a signal for remote monitoring of said each branch circuit breaker.

8. The panelboard in claim 1 wherein said electromagnetic actuator is a solenoid.

9. The panelboard in claim 1 wherein said protection function provided by said electronic control module allows for setting a trip setting value for said each branch circuit breaker.

10. The panelboard in claim 9 wherein said trip setting value includes at least one of:
- long time pick-up,
- long time delay,
- short time pickup,
- short time delay, and
- trip time curve.

11. The panelboard in claim 1 wherein said electronic control module includes a high current alarm function.

12. The panelboard in claim 1 wherein said electronic control module includes a breaker trip alarm.

13. The panelboard in claim 1 wherein said electronic control module includes a ground fault trip function.

14. The panelboard in claim 1 wherein said electronic control module includes a remote communication functionality.

15. The panelboard in claim 14 wherein said remote functionality includes a host controller, and said host controller is in communication with said electronic control module via a local area network.

16. The panelboard in claim wherein said host controller is programmed for monitoring said electronic control module.

17. The panelboard in claim 15 wherein said host controller is connected via an Internet connection to a remote computer such that said remote computer is capable of monitoring said electronic control module.

18. The panelboard in claim 15 wherein said host controller is programmed to download trip setting values to said electronic control module.

19. The panelboard in claim 15 wherein said host controller is connected via an Internet connection to a remote computer such that said remote computer is capable of downloading trip setting values to said electronic control module.

20. The panelboard in claim 1 wherein said electronic control module includes a ground fault alarm.

21. The panelboard an claim 1 wherein said each branch circuit breaker includes:
- a magnet in electrical communication with said circuitry; and
- an armature in electromagnetic communication with said magnet, said armature for operably controlling said pair of separable contacts.

22. The panelboard in claim 21 wherein said armature operably opens said pair of separable contacts indicative of a short circuit.

23. The panelboard in claim 1 wherein said each branch circuit breaker includes an electrical connector configured to provide electrical connection with said electronic control module before electrically connecting to said circuitry, thus operably controlling said pair of contacts before said power source is connected when installing said each branch circuit breaker.

24. An electronic control module connected to a plurality of circuit breakers employed in a panelboard, the electronic control module comprising:
- a single microcontroller configured to operably monitor and control said plurality of circuit breakers, said microcontroller configured to provide a trip signal to a circuit breaker of said plurality of circuit breakers in response to an overcurrent condition in said circuit breaker,
- an input device configured to select one of said plurality of circuit breakers for inputting a trip setting value for said selected one of said plurality of circuit breakers, said input device in communication with said microcontroller;
- a display in communication with said microcontroller; and
- a storage device for storing said trip setting value for each of said plurality of circuit breakers.

25. The electronic control module in claim 24 wherein said input device includes:
- a first keypad for selecting one of said plurality of circuit breakers;
- a second keypad for inputting a trip setting value for said selected one of said plurality of circuit breakers, said first and second keypads are in communication with said microcontroller.

26. The electronic control module in claim 24 further comprising:
- a communications port in communication with said microcontroller.

27. The electronic control module in claim 24 wherein said trip setting value includes at least one of:

long time delay.

short time delay, and trip time curve.

28. The electronic control module in claim 24 wherein said display includes an indicator indicating the status of said one of said plurality of circuit breakers selected with said input device.

29. The electronic control module in claim 24 wherein said plurality of circuit breakers comprise a main circuit breaker and a plurality of branch circuit breakers.

30. The electronic control module in claim 29 wherein a ground fault through said main circuit breaker is sensed by a neutral current transformer disposed around a neutral line strap in the panelboard, a signal from said neutral current transformer is received by the electronic control module for processing to determine the presence of said ground fault.

31. A method for providing overcurrent protection and control to an electric circuit with a single controller, the method comprising:

receiving a trip setting value selected for each branch circuit of a plurality of branch circuits in the single controller;

storing said trip setting value in non-volatile memory;

receiving a plurality of sensed signals from a current sensing device employed in said each brunch circuit indicating a current therethrough;

processing said plurality of sensed signals to detect an overcurrent condition in said each branch circuit; and generating a trip signal to an electromagnetic device coupled to separable contacts employed in each circuit breaker of said each branch circuit for interrupting current therein when an overcurrent condition is detected.

32. The method of claim 31 further comprising:

generating an alarm when any of said each circuit breaker is tripped.

33. The method of claim 31 further comprising:

processing said plurality of sensed signals to detect a high current condition in said each branch circuit; and generating an alarm for any high currents detected in any of said each branch circuit.

34. The method in claim 31 wherein said each circuit breaker includes a main circuit breaker for interrupting current in the electric circuit.

35. The method in comprising:

displaying each of said plurality of sensed signals and said trip setting value selected via a display connected with said controller for monitoring a current condition in said each branch circuit.

36. The method in claim 31 wherein said trip setting value includes:

long time delay, short time delay, and trip time curve.

37. A panelboard configured for distributing electricity from a power source, said panelboard comprising:

circuitry for distributing said electricity from said power source, said loads;

a plurality of branch circuit breakers, each branch circuit breaker intermediate said power source and said plurality of branch circuits; and an single electronic control module for controlling said main circuit breaker and said plurality of branch circuit breakers, said electronic control module provides a protection function and a monitoring function of said circuitry, each branch circuit breaker of said plurality of branch circuit breakers includes;

a pair of separable contacts as a sole switching means in said each branch circuit breaker;

an electromagnetic actuator in electrical communication with said electronic control module for operably controlling said pair of separable contacts; and a current transformer configured to sense current on said circuitry to one of said associated loads.

* * * * *